July 22, 1969    O. W. GRAHAM    3,456,679
SAFETY LOCK FOR HIGH PRESSURE VALVES
Filed Sept. 17, 1965    3 Sheets-Sheet 1

INVENTOR.
OLLIE W. GRAHAM
BY *Arthur L Wade*
ATTORNEY

July 22, 1969
O. W. GRAHAM
3,456,679
SAFETY LOCK FOR HIGH PRESSURE VALVES
Filed Sept. 17, 1965
3 Sheets-Sheet 2
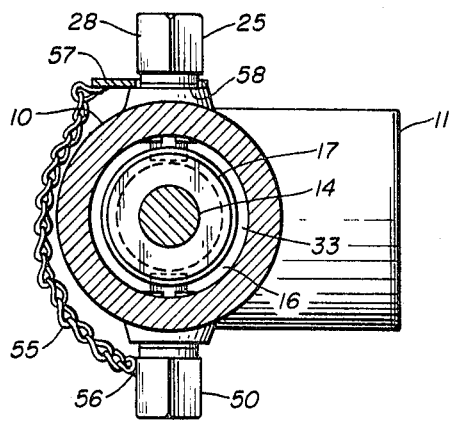
Fig. 5.
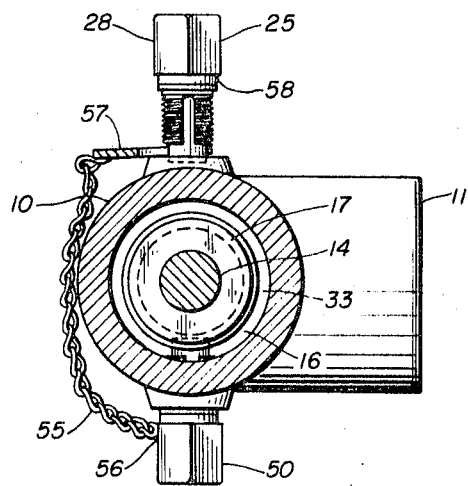
Fig. 6.
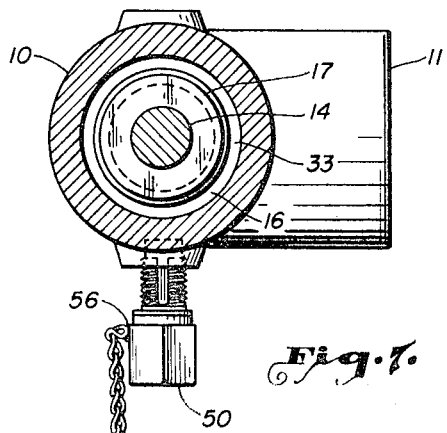
Fig. 7.
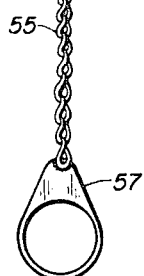
INVENTOR.
OLLIE W. GRAHAM
BY *Arthur L. Wade*
ATTORNEY July 22, 1969     O. W. GRAHAM     3,456,679
SAFETY LOCK FOR HIGH PRESSURE VALVES
Filed Sept. 17, 1965     3 Sheets-Sheet 3

INVENTOR.
OLLIE W. GRAHAM
BY *Arthur L. Wade*
ATTORNEY

United States Patent Office 3,456,679
Patented July 22, 1969

3,456,679
SAFETY LOCK FOR HIGH PRESSURE VALVES
Ollie W. Graham, Tulsa, Okla., assignor to Combustion Engineering, Inc., New York, N.Y., a corporation of Delaware
Filed Sept. 17, 1965, Ser. No. 487,999
Int. Cl. F16k *43/00, 51/00;* F16l *55/18*
U.S. Cl. 137—315                                             13 Claims

ABSTRACT OF THE DISCLOSURE

A high pressure valve has its movable element retained in the body of the valve by an external coupling and safety locked by a bolt extended through the valve body into a groove of the movable element.

---

This invention relates to retention of a fluid-energized member within an opening until the fluid pressure has been reduced sufficiently to prevent the member from being propelled from the opening as a dangerous projectile when released.

The equalization of fluid pressure within couplings, prior to disassembly or uncoupling couplings or connecting devices, with the pressure exteriorly thereof has been of concern to manufacturers of equipment for high pressure work, particularly the high pressure work in the oil fields. Safety bleed valves have been provided to relieve the interior pressure of couplings prior to disassembly. Mechanical means have been provided to prevent the disassembly until the bleed valve has been actuated to relieve the pressure.

The basic objective in relieving pressure is to prevent any member, associated with the coupling and energized by contact with the fluid pressure, from becoming a dangerous projectile upon disassembly of the coupling. There is a history of injury to personnel from fluid energized projectiles released when couplings retaining high pressures have been broken down, disassembled. The relief of this pressure is a fundamental requirement for safety. The more easily and quickly a coupling can be disassembled, the more critical the need for pressure relieving.

The prior art has concerned itself with the arrangements which prevent the coupling parts from being disengaged prior to pressure relief. However, I have addressed myself to those members of the coupling, or members retained by the coupling, which are potential projectiles under the influence of the fluid pressure within the coupling. Rather than prevent disengagement of the basic coupling parts, I propose control of the potential projectile in its normally operative position while simultaneously relieving the fluid pressure tending to make it a hazardous projectile if released from restraint.

A principal object of my invention is to mechanically retain any potential projectile member in substantially its normally operative position until the fluid pressure within a disassembled coupling for the member is relieved.

Another object is to provide a safety bleed-down valve which will mechanically retain a potential projectile member against fluid pressure and simultaneously relieve the fluid pressure after the coupling which normally seals the fluid pressure and holds the member in operative position.

The present invention contemplates an operative device, or member, mounted in an opening of a container in which fluid pressure is developed. The member is normally mechanically held in operative position within the opening by a coupling which also seals against the escape of the fluid pressure from the container. A removable mechanical stop member is mounted on the container and extends into mechanical engagement with the member to provide enough retaining strength against projection of the member from its opening, by the fluid pressure, when the coupling is disassembled. Additionally, the stop member is provided with a passage through which the fluid pressure will relieve before the stop member is completely removed from its retaining position relative the operative device, or member.

Other objects, advantages and features of this invention will become more readily apparent to one skilled in the art upon consideration of the written specification, appended claims, and attached drawings, wherein:

FIG. 5 is a section of FIG. 1 along lines 5—5 showing how both bolts can be linked together;

FIG. 6 is a view similar to FIG. 5 showing one bolt disengaged from the suffing box while holding one end of the chain captive;

FIG. 7 is a view similar to FIG. 6 showing one end of the chain freed from capture by one bolt so the second bolt may be removed;

Choice of equipment for embodiment of the invention

Figure 1:
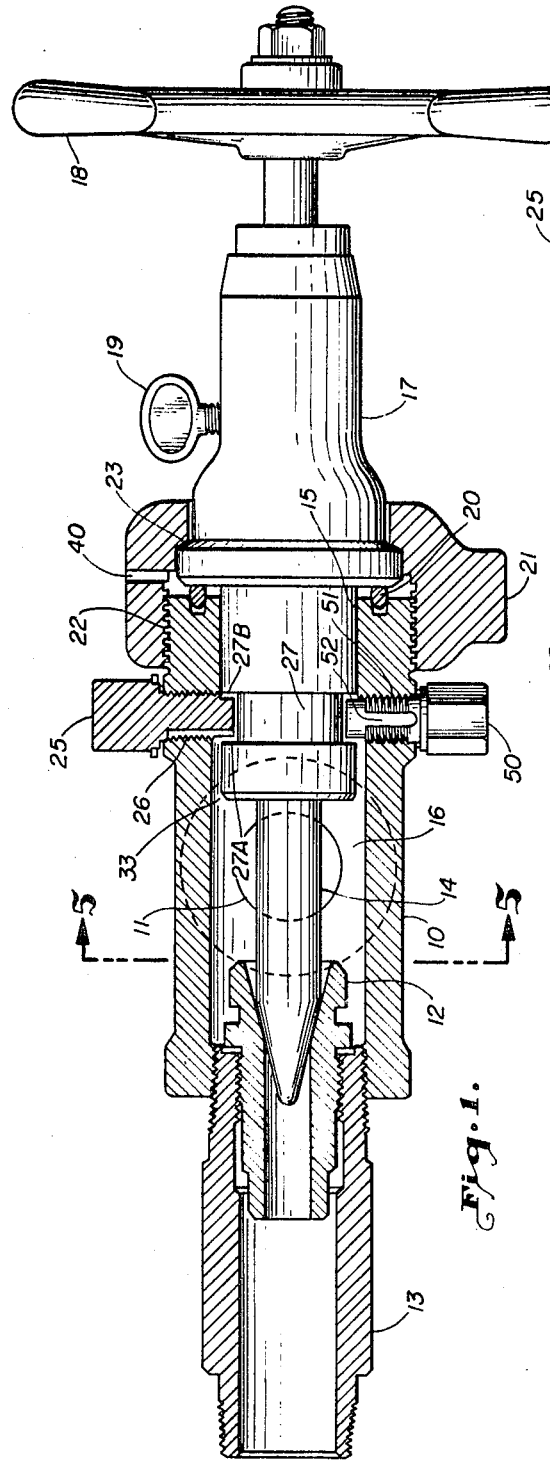
FIG. 1 is a partially sectioned elevation of a high pressure oil field valve in which the present invention is embodied.

The present invention is concerned with the direct and positive control of potential projectiles energized by fluid pressure, and a very important piece of oil field equipment is used to initially disclose the invention. FIG. 1 illustrates the essential parts of a high-pressure valve, commonly referred to as a choke. These valves are designed to receive the production of an oil well at, or close to, the native pressure of the formation being produced. This pressure could go to many thousands of pounds per square inch but the pressure of the majority of wells range down from 4,000 pounds per square inch.

The seat and valve element of the choke are made of special materials to resist wear by the extremely abrasive stream passing between them. Nevertheless, wear does take place to this so-called trim and replacement of these parts is an expected portion of a maintenance program on this type of equipment. It is the disassembly of this choke which becomes a classic example of the problem solved by the present invention. The valve stem and its stuffing box is an example of a potentially hazardous projectile. Energized by the fluid pressure within the body of the choke, then freed from restraint, this member will be propelled from its normally operative position with all the expected hazards to life and property in its path.

Specific arrangement and function of choke

In FIG. 1 the body 10 of a choke is provided with an inlet conduit 11. The well stream, or other high pressure fluid, is brought into body 10 through this conduit 11 and passes through seat, or flow bean, 12 to downstream equipment attached to outlet conduit 13. The adjustment of valve element, or choke needle, 14 relative to the seat 12 controls the flow of the stream.

The element 14, and its associated parts, mounted in the opening 15 of body 10, comprise the potential projectile which is energized by the pressure of fluid in bore 16 of body 10. If this assembly, as a unit, were freed of mechanical restraint, it would be propelled to the right as a tremendous hazard.

In functioning normally, valve element 14 is mounted to move axially, or longitudinally, to the right as viewed in FIG. 1 from the seat 12. The seat 12 is then open and permits the fluid to flow therethrough under controlled conditions, in the well-known manner. Valve element 14 is mounted through a stuffing box 17. Threads within box 17 engage threads formed on element 14. Handle 18 is rotated and the thread engagement moves the element 14 longitudinally. A set screw 19 is provided for holding the element in a predetermined position as may be externally indicated. Also, within box 17 packing is carried for sealing around the element 14.

Grooves are formed in opposite faces of box 17, and the body surface surrounding opening 15. A sealing element 20 is placed in these grooves to bridge across them and seal the pressure within bore 16 against escape out opening 15. This seal is brought together and made effective by a nut 21 threaded at 22 to the external surface of body 10 and bearing on a shoulder 23 of box 17. Without the present invention, this threaded engagement at 22 would be the only control to prevent the element 14, box 17 and wheel 18 becoming a hazardous, fluid-energized, projectile.

It is essential that stuffing box 17 and element 14 be periodically removed for inspection, repair and replacement of seat 12 and element 14. Nut 21 must be removed to do this. It is desirable to first bleed off the pressure from within body 10, as a container in which the pressure has been developed. It is obvious that this reduction in pressure must be brought about before box 17 is freed of mechanical restraint.

Prior art vs. present invention

The prior art has met the present problem by providing a bleed valve which is mechanically linked with nut 21. The bleed valve was actuated to bleed down the pressure in body 10 before nut 21 could be disengaged from the body and thereby free stuffing box 17. The present invention approaches the problem in an entirely different manner.

Rather than control the stuffing box 17 with nut 21 only, the present invention provides an entirely separate retaining structure as a positive link between the body 10 and the potential projectile, in this case stuffing box 17, needle 14 and handle 18. With this separate, manually removable mechanical link in operative position, the nut 21 is no longer the only factor in the safety system. As a matter of fact, the nut 21 can be removed completely and there will be no hazard created by the stuffing box assembly as a potential projectile.

Figure 4:
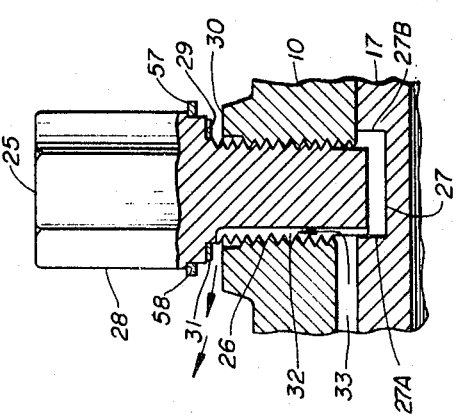
FIG. 4 is a view similar to FIG. 3 but with the bolt disengaged, or unlocked, from the stuffiing box.
Figure 3:
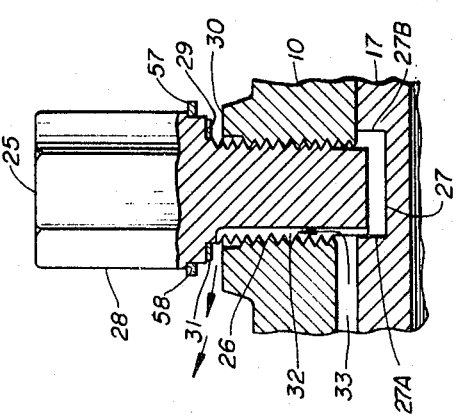
FIG. 3 is a view similar to FIG. 2 but with the bolt partially withdrawn from its locking position.
Figure 2:
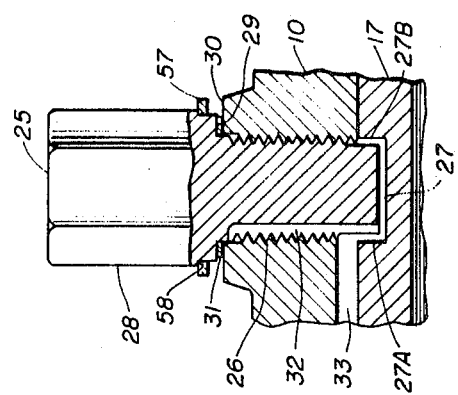
FIG. 2 is an enlarged sectioned elevation of a portion of FIG. 1 showing a bolt positioned to lock the stuffing box in its normally operative position.

The present invention is specifically embodied in a bolt extended through the side of the housing 10 and into a groove formed in the external surface of the portion of the stuffing box extending into bore 16. More specifically, bolt 25 is extended through hole 26 and into groove 27. FIGS. 2, 3 and 4 show this arrangement somewhat more clearly because of their larger scale.

Basic positions of bolt 25

FIGS. 2, 3 and 4 have been established to illustrate the three significant positions in which bolt 25 is placed. FIG. 2 is simply the position for bolt 25 first illustrated in FIG. 1. FIG. 3 shows the bolt partially withdrawn. The seal is broken to allow the fluid pressure in bore 16 to escape, but the full effective shear area of the bolt controls the box 17 and keeps it positively captured. FIG. 4 shows the bolt disengaged from groove 27 and box 17 partially dislodged from its normally operative position within housing 10.

Details associated with bolt 25

As previously indicated, bolt 25 is placed in shear by fluid pressure in body 10 acting on box 17. Therefore, the materials of the bolt and box, as well as the size of the bolt and depth of the groove must be formed to meet the duty requirements imposed by the range, and fluctuation within the range, of fluid pressure within bore 16.

Movement of the bolt between the basic positions must be controlled. The sides of bore 26 and the sides of bolt 25 are engaged through threads so axial movement of the bolt can be brought about by rotation of bolt 25.

A seal between the bolt 25 and body 10 must be maintained when the box 17 is held in normally operative position. The head 28 is provided with a suitable face 29 which can be sealed to face 30 on body 10. A gasket 31 is captured between face 29 and face 30 to provide the required seal.

Once the seal between faces 29 and 30 is broken, the pressure within body 10 must be positively and efficiently relieved. A passageway 32 is formed as a milled groove across the bolt threads. This passageway 32 extends from just below gasket 31 to annular space 33 between the end of box 17 and the internal wall of bore 16. Once the seal is broken, as illustrated in FIG. 3, the fluid pressure within housing 10 begins to equalize with the atmosphere, the rapidity of the equalization limited by the capacity of this route of which passageway 32 is a part.

To provide increased capacity for the fluid pressure released, a second passageway similar to 32 may be provided at another location on the bolt 25. This second passageway is not specifically shown, but it is obvious passageway 32 can be duplicated. Further, the fact that the turning of bolt 25 will bring the body threads of bore 26 through the passageways has the advantage of cleaning them of any obstructing material which may collect in them. The well fluids controlled can have any number of foreign substances entrained which will drop out in such crevices as represented by pasageway 32. The body threads, carried through the passageway on bolt 25, will at least loosen this foreign matter and facilitate its discharge under the pressure of the fluid from body 10.

Nut 21

In considering the provisions for safety during disassembly of the coupling for the choke, the relief of the fluid pressure through threads 22 has been studied. Threads 22 are commonly made in the form of relatively coarse, square-shape. These are generally designated "acme" threads. This construction is intended to be a strong, quickly made up engagement and inherently passes quite a large volume of fluid.

It is obvious that if the seal ring 20 readily loosens from both its grooves fluid will pass from bore 16 to the atmosphere. Under these conditions it has been considered that a fair rate of bleed-down will occur from housing 10 before threads 22 are disengaged to a dangerous extent, i.e., stuffing box 17 freed from this mechanical restraint.

However, the stuffing box 17 is usually sized to have but a few thousands of an inch clearance with the internal wall of bore 16 before seal ring 20 is reached. The bleed-down capacity of this path is too small to give adequate time to provide equalization before many service personnel would unthread nut 21.

Further, the corrosive and dirty conditions to which seal ring 20 is subjected quite often cause the ring to jam in its grooves. Several hundred pounds per square inch of pressure can be retained behind box 17 with nut 21 completely disengaged. Freed of the restraint of nut 21, box 17 will become a hazardous projectile if the bond between seal ring 20 and the bodies it seals between is jarred loose.

However, it is possible that seal ring 20 will readily release from its grooves in box 17 and/or body 10. This release can frequently occur while nut 21 is still safely coupled to body 10 through threads 22. If so, a substantial amount of leakage of pressure fluid will occur from bore 16 to threads 22.

To facilitate the discharge of the fluid pressure to the atmosphere, a hole 40 is drilled through nut 21 to the recess within the coupling above threads 22. This hole 40 then provides a conduit for fluid which is less restricted than through engaged threads 22. The fluid will jet from this hole 40 and should provide adequate notice to the person turning nut 21 that dangerous fluid pressure is energizing box 17; fluid pressure which should be bled from bore 16 before nut 21 is completely disengaged.

It is possible that hole 40 will become plugged with foreign matter during normal usage of the choke. This plugging could prevent the hole from functioning as a warning device. The bolt 25 is then available as a positive, dependable safety device to control box 17 if hole 40 fails to function and nut 21 is completely removed. Also bolt 25 performs if seal ring 20 does not disengage and release box 17 to discharge the fluid pressure into the recess within nut 21 above the threads 22.

The leakage through partially disengaged threads 22 and/or hole 40 is a welcome notice of the dangerous fluid pressure. However, the present invention backs up these warnings by locking the box 17 positively into place until the fluid pressure is bled down from bore 16.

Double bolt

Bolt 25, as previously disclosed, embodies broad concepts of the invention. It will provide the positive control of box 17 and simultaneous bleed-down of bore 16 pressure. However, concepts of the invention also include provision of a companion bolt as an additional feature of the safety system.

Bolt 50 is shown in FIG. 1 as similar to bolt 25, but extended through a hole 51 which is drilled through body 10 in the side opposite the side hole 26 is drilled. The holes 26 and 51 are axially aligned, although this alignment is not necessary to provide the additional feature of safety.

Bolt 50 is also shown as provided with a passageway 52 which is similar to passageway 32 in bolt 25. In FIG. 1 this passageway 52 is shown as positioned ninety degrees to passageway 32 and thereby the configuration of both passageways is given more complete disclosure.

Bolt 50 extends into groove 27 as does bolt 25. Both bolts thereby positively lock box 17 into its normally operative position. Either bolt will maintain box 17 locked in this position. Therefore, if provision is made for keeping one bolt in the locked position until complete removal of the other bolt, the full capacity of the hole from which the first bolt is removed will be made effective to equalize the pressure of bore 16 with the atmosphere and/or provide an audible warning notice that said equalization is taking place but has not been attained. FIGS. 5, 6, and 7 are established to show how this sequence of bolt removal is insured.

FIGS. 5, 6 and 7 are established to illustrate the provision for determining the sequence with which bolts 25 and 50 are removed from their respective engagements with groove 27 of box 17. It is desired that all the bleed-down potential for bore 16 be established through the hole of one bolt before the other bolt can be disengaged from positively locking the potential projectile stuffing box 17 represents. Therefore, a connection is provided between bolts 25 and 50 which insures this desired sequence.

To form FIGS. 5, 6 and 7, a section is taken of the FIG. 1 choke along the line 5—5. Only the external heads of the bolts 25 and 50 are seen. It is to these heads the required connection is applied.

The connection is essentially a stout chain 55, attached by each of its ends, to bolts 25 and 50. The attachments are made to allow bolt 25 to be removed from its hole 26 but to prevent the removal of bolt 50 from its hole until the end of chain 55 is freed from bolt 25.

The attachment of chain 55 is made at 56 to the head of bolt 50. The attachment is fixed to the bolt. The head could be drilled and a pin placed through the end link of the chain and pinned into the hole in the bolt head. The last link of the chain could be welded to the bolt head. The concept, regardless of the manner of specific attachment, is to fix the chain and bolt head together so that when the chain is tight, the bolt cannot be rotated enough to disengage its inner end from positively locking box 17 into its operative position.

The chain, with its first end permanently attached to bolt 50, is then extended around the outside of the body 10 and attached to a ring 57 which is captured by head 28 of bolt 25. Ring 57 is specifically captured by a shoulder 58 formed on head 28 and permitted limited axial movement along bolt 25. However, the hole in ring 57 is large enough to not restrict the turning of bolt 25 as it is unthreaded from its hole 26. As a matter of fact, as bolt 25 is removed from hole 26, bolt 25 slips readily through the hole of ring 57 as shown in FIG. 6. With chain 55 freed from bolt 25, bolt 50 can then be removed and box 16 unlocked. Of course, by the time bolt 25 has been removed, the pressure in bore 16 has been bled down, through at least the hole 26, to preclude stuffing box 17 being ejected as a dangerous projectile out the end of body 10.

Level control embodiment

The choke is perhaps the more dramatic embodiment of the invention. However, any container of high pressure fluid with openings sealed by closures is a candidate for embodiment of the invention. Some sort of operating equipment is mounted in the openings, sealed to the container with fastenings which thread, or otherwise couple, to the container and seal the fluid pressure from escape to the atmosphere.

Removal of the equipment is eventually required, and perhaps on a periodic program of inspection. General precautions should be taken to reduce the pressure in the vessel so that the uncoupling of the seal about the equipment will not suddenly convert the equipment into a fluid energized projectile. However, service and maintenance practices in the oil fields often are not safely founded and carried out. At the very time an operator should check the fundamental fact of whether a vessel he is working on has pressure inside, he fails to do so. This operator then hastily breaks the seal from about the operating equipment he is to inspect, repair or replace and this equipment is projected into his body, injuring and perhaps killing him.

Figure 8:
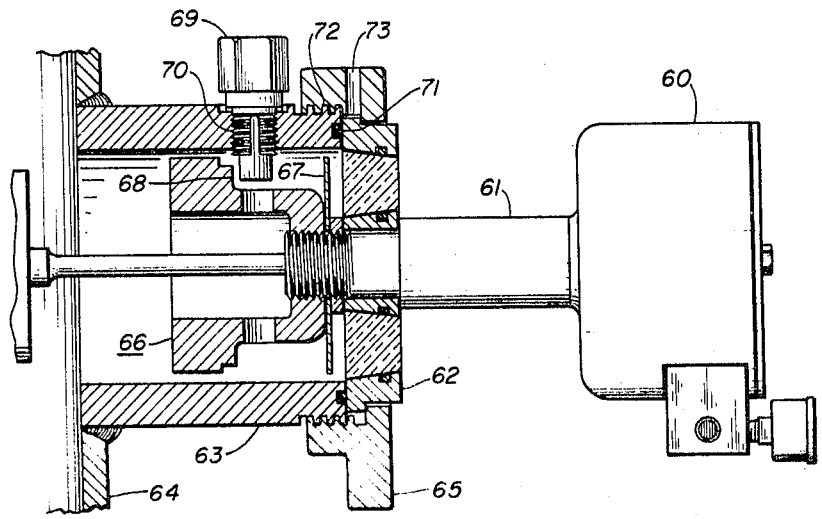
FIG. 8 is a sectioned elevation of the part of a level control apparatus mounted in operative position and embodying the present invention.
Figure 9:
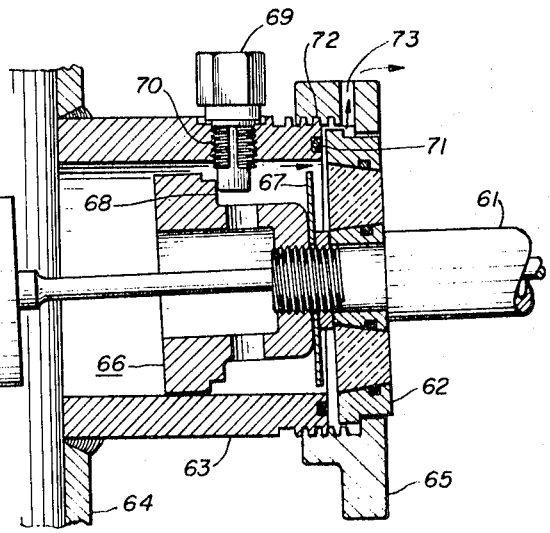
FIG. 9 is a view similar to FIG. 8 showing the mounting nut partially disengaged.
Figure 10:
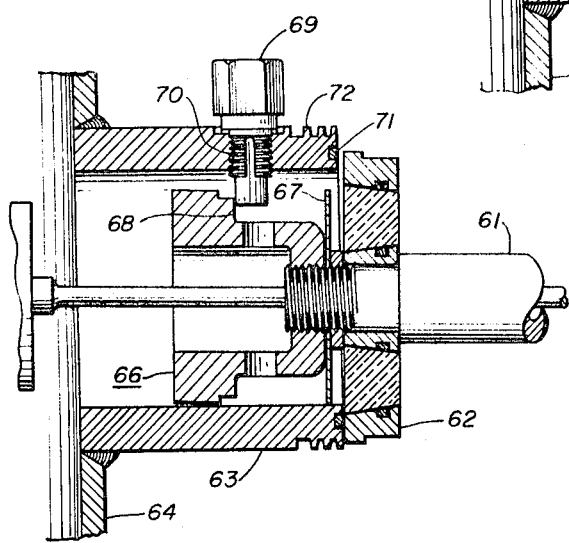
FIG. 10 is a view similar to FIG. 9 showing the mounting nut removed and the control apparatus retained by a bolt.

The present invention is embodied in a safety system which avoids this result. Under the same principles applied to the choke previously illustrated, the potential projectile of a level control instrument is positively locked until any fluid pressure energizing its discharge from its normally operative position has been equalized with the lower pressure external the vessel in which it is mounted. FIGS. 8, 9 and 10 are established to illustrate how simply the invention can be adapted to a level control apparatus.

FIGS. 8, 9 and 10 all show the same level control apparatus in various mounting relations to a container of liquid whose level is detected and controlled. This control is disclosed in U.S. Patent 3,089,338 and is here shown with the present invention embodied in connection with it.

The basic problem is as simple as the problem associated with the choke—how do you prevent control box 60, column 61, flange-disc 62 and associated parts from being discharged from collar 63 as a projectile under the fluid pressure force in vessel 64 to which collar 63 is merely an extension? Remove nut 65 and a projectile is just what this apparatus will become. However, the present invention solves the problem by positively preventing this projectilizing.

In the Patent 3,089,338 a nut 22 is disclosed as threaded to the internal end of collar 17 to capture the reflecting disc on a spacer. In the present embodiment, a yoke 66 replaces the nut. This yoke is a stout structure of generally cylindrical form, adapted to receive the internal threaded end of collar 61 to capture reflecting disc 67 and to provide a retaining abutment 68 for locking bolt 69.

Bolt 69 is similar to bolts 25 and 50 of the choke disclosure. The bolt extends through a hole 70 in the side of collar 63 and into alignment with abutment 68. Any movement of the assembly 60–61–62–66 from the collar 63 is positively limited by engagement between the end of bolt 69 and the abutment provided by yoke 66. The nut 65 could be completely removed and bolt 69 positively prevent the assembly from being blown outward as a dangerous projectile.

An additional feature is made available by this arrangement not found in the choke. The clearances between the internal walls of the collar 63 and the yoke are somewhat greater than between the internal walls of the choke body and the stuffing box. Therefore, if there is fluid pressure remaining in the vessel 64 when nut 65 is removed, the bolt 69—abutment 68 engagement will cause the assembly to "cock" as illustrated in FIG. 10 and release a tremendous quantity of fluid pressure to equalize with the atmosphere.

However, before the extreme relieving "cock" of FIG. 10 is reached, it is expectd that the simple O-ring seal at 71 will have broken and relieved sufficient pressure to bleed down the vessel pressure to safe limits.

It is always possible to provide two bolts as was disclosed in connection with the choke. This does not seem a necessary safeguard under normal circumstances. However, the positive protection of the invention would be fully effective to safeguard this embodiment of FIGS. 8, 9 and 10 if desired.

Choke disassembly procedure

FIGS. 1–7 disclose the structure, and illustrate most of the functions, involved in a safe disassembly of the high pressure valve, or choke. However, it is well to review the sequence of steps normally taken to insure complete safety to the field personnel inspecting, repairing and replacing the parts of this device.

FIG. 1 shows the choke completely assembled. Nut 21 is fully engaged with body 10 to force stuffing box 17 into sealing to body 10 through ring 20. The first step of disassembly is to unthread nut 21.

As nut 21 is unthreaded, seal ring 20 may, or may not, loosen in its groove in body 10 and/or groove in box 17. The fluid pressure in bore 16 should have been previously equalized with the pressure external the body 10. However, the assumption is made that there was a failure to make this equalization and fluid pressure is dangerously energizing the box 17 ready to turn it into a hazardous projectile when mechanically freed of restraint. Threads 22 are coarse, and if the seal of ring 20 breaks when nut 21 is loosened the fluid pressure in bore 16 should evidence itself by an ominous hissing or squealing sound which will warn any personnel loosening nut 21 that the situation is dangerous if he continues to unthread nut 21.

Also, the fluid should jet from hole 40 which has been drilled through nut 21 to communicate with the space external the seal of ring 20. The fluid pressure from this hole 40, with or without the discharge through threads 22, should add to the warning given personnel removing nut 21.

It is possible that the pressure of bore 16 will sink to a few hundred pounds per square inch. This pressure, released through threads 22 and/or hole 40 may not give a very loud sound of warning. Still, a fluid pressure of a few hundred pounds per square inch could turn box 17 into an instrument of injury and death if mechanically freed.

Bolt 25, in groove 27, forms a positive line of protection behind threads 22, hole 40 and jammed ring 20. Until the end of nut 25 is removed from groove 27, box 17 is going nowhere.

To give the first line of warning an additional opportunity to function, the end of bolt 25 can be given enough clearance with the walls of groove 27 to allow the stuffing box 17 to move out of bore 16 far enough to break the seal of ring 20. This clearance at 27A and 27B is indicated. It would be preferred that no clearance to be provided at 27B, but tolerances are difficult to hold so close. However, there should be enough travel of box 17 to give ring 20 a good opportunity to move out of at least one of its grooves and break the seal at this point. Of course, the pressure in bore 16 must be great enough to move box 17 against the wedged, or stuck, seal ring 20 to grip on the sides of its grooves. If this pressure is not great enough to cause this movement and result in the warning bleed of dangerous pressure through hole 40 and threads 22 it could still be great enough to projectilize box 17 when box 17 is finally broken free of mechanical restraint. So the positive coupling of the end of bolt 25 and groove 27 in box 17 backs up the possibility of an audible warning through hole 40 and threads 22.

Nut 21 can be removed entirely with no danger. Bolt 25 will hold box 17 in its operative position. Certainly bolt 25 and bolt 50, together, will give adequate protection against any reasonable range of expected fluid pressure in bore 16.

Prudence should dictate only a partial disengagement of nut 21 from threads 22. Then bolt 25 should be disengaged to break the seal at gasket 31. FIG. 3 shows how passageway 32 will then conduct fluid pressure from bore 16 to external the body 10. This escape of fluid pressure should either quickly equalize the internal pressure of body 10 with the external pressure or give still another whistle of escaping fluid to warn the personnel breaking open the choke. The warning comes well before positive disengagement between the bolt 25 and the sides of groove 27 as shown by FIG. 3. By the time this stage is reached in the proceedings, even grossly imprudent personnel should have the message forced upon them that there is a dangerous fluid pressure in bore 16 which should be relieved before box 17 is released as a danger to life and property. However, there is still another safeguard provided before bolt 25 is disengaged and box 17 withdrawn as indicated in FIG. 4.

Bolt 25 is supplemented by bolt 50. The two are similar in their bleed provisions. Further chain 55 represents a link which insures that one of these bolts is fully removed from body 10 before the other. Then bore 16 is provided with at least the full bleed capacity of bore 26 before box 17 is unlocked from positive disengagement with both bolts. In this full sequence we arrive at a complete drain of pressure from bore 16 to prevent box 17 from being turned into a fluid energized projectile. Thus we have an invention which provides a complete series of safeguards against injury and damage.

Level control disassembly procedure

Under the principles of disassembly procedure for the choke, the disassembly procedure for the level control is almost obvious from observation of FIGS. 8–10. FIG. 8 shows the level control mounted in normally operative position within collar 63. FIG. 9 shows the nut 65 loosened enough to break the seal of O-ring 71. FIG. 10 shows the level control position following complete removal of nut 65.

When the nut 65 is backed off to the position shown in FIG. 9 any fluid pressure within vessel 64 will bleed through threads 72 and/or bleed port 73 in nut 65. This bleed should serve as a first line of warning that a dangerous condition exists.

However, the nut 69 engagement with abutment 68 will positively lock the control into collar 63 should the nut 65 be completely removed as illustrated in FIG. 10. Further, the control assembly will cock flange-disc 62 so far over that a generous passage for fluid will be provided to either warn the operator or bleed down the vessel 64. After the fluid pressure is safely equalized with the atmosphere, nut 69 may be removed and the control withdrawn from collar 13 for inspection, repair or replacement.

From the foregoing it will be seen that this invention is one well adapted to attain all of the ends and objects hereinabove set forth, together, with other advantages which are obvious and which are inherent to the method and apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The present invention having been described, what is claimed is:

1. A safety system for disassembly of a high pressure valve, including:
   a body for a high pressure valve having an exit and discharge openings across a seat,
   a valve element positioned with respect to the seat to control fluid passing through the body,
   a stuffing box assembly extending through a wall opening,
   a seal between the stuffing box and body,
   a nut removably attached to the box and body to bring them together on the seal and render it effective to prevent the escape of fluid pressure from the body across the seal,
   a bolt inserted through a hole in the body and extended into a groove in the box so that a side of the groove will act as an abutment for the end of the bolt in positively locking the box from being pushed out of its wall opening if the nut were removed from attachment to the box,
   and a passage along the length of the bolt which is available to pass fluid pressure to the atmosphere when the head of the bolt breaks its seal with the body of the valve but before the bolt is disengaged from the box groove.

2. The system of claim 1, in which:
   a passageway is provided through the nut from the outside to the interior space between the attachment between the nut and valve body,
   and the nut and stuffing box groove are sized to provide enough movement of the box by fluid pressure after the nut is partially removed to break the seal between the box and body to direct fluid pressures in the body out of the passageway through the nut.

3. The system of claim 1, including:
   a second bolt inserted through a second hole in the body and extended through a second hole in the body and extended into the same groove in the box to act as a second lock for the box.

4. The system of claim 3 including:
   the link of a chain fixed permanently to the head of the second bolt so as to prevent substantial turning of the bolt when the chain is drawn up tight,
   a ring arranged on the first bolt to be captured by the bolt head against removal but allow the bolt to be removed from its hole in the body,
   and a second link of the chain fixed permanently to the ring to maintain the chain drawn up tight enough to prevent substantial turning of the second bolt until the chain is freed from the first bolt by removal of the first bolt from its hole in the body.

5. A coupling for a member mounted within an opening of a container to seal the fluid pressure within the container, including:
   an entrance conduit mounted through wall of a container of fluid pressure,
   a member mounted in operative position within the entrance conduit,
   a coupling member attached to the entrance conduit and sealing the mounting member to the entrance conduit to retain the fluid pressure within the container,
   a connecting member fixed to the container and removably positioned to retain the operative member against the force of the fluid pressure within the container after the coupling member is disengaged from the entrance conduit,
   and means on the connecting member for releasing fluid pressure from the container before the connecting member is removed hto release the operative member for inspection or replacement or repair.

6. The coupling of claim 5 in which:
   the connecting member is a bolt extending through a hole in the wall of the container and into engagement with an abutment on the operative member.

7. The coupling of claim 6 in which:
   the bolt has a head sealed to the wall of the container and a passage as the means of the connecting member which communicates the interior of the container with the exterior of the container when the head seal is broken and before the bolt is disengaged from the abutment on the operative member.

8. The coupling of claim 6 in which:
   a second bolt is extended through a second hole in the wall of the container and into engagement with an abutment on the operative member,
   and a connection between the two bolts which precludes both bolts being disengaged from their abutments at the same time.

9. The coupling of claim 6 in which a clearance is provided between the bolt and abutment on the operative member which will allow the operative member to move under the force of the fluid pressure after the coupling member is partially disengaged from the entrance conduit, the operative member moving enough to break the seal with the container and initiate discharge of fluid pressure from the container between the operative member and the container.

10. A safety system for dismounting an instrument assembly normally functioning as mounted in an opening of a vessel having a high fluid pressure therein, including:
   a collar attached to a high pressure vessel for receipt of an instrument assembly therein,
   a seal structure between faces on the collar and on the instrument assembly,
   a nut structure engaging the instrument assembly and collar faces with the seal between them to retain the fluid pressure within the vessel,
   a yoke mounted on the instrument assembly and positioned within the collar adapted to engage a restraining member mounted through the collar,
   and a restraining bolt member mounted through the collar and into alignment with the yoke to positively prevent the instrument assembly from being ejected from the collar as a projectile when the nut is removed.

11. The system of claim 10 in which the bolt has a passageway extended from its sealing surface to the collar so that when the bolt is partially removed to break the seal, fluid will pass from the vessel.

12. The system of claim 10 in which the bolt is positioned from the yoke far enough to let the instrument travel outward upon partial removal of the nut to break the seal and permit fluid to escape from the vessel.

13. The system of claim 12 in which the bolt is positioned to engage the yoke so the complete assembly of instrument and yoke will "cock" and permit fluid to pass from the vessel around the instrument.

References Cited

UNITED STATES PATENTS

| | | | |
|---|---|---|---|
| Re. 20,529 | 10/1937 | Penick et al. | |
| 941,652 | 11/1909 | Rock | 137—583 |
| 1,519,231 | 12/1924 | Benjamin | 251—216 |
| 1,706,051 | 3/1929 | Auchincloss | 220—55.3 |
| 1,956,987 | 5/1934 | Hose | 137—629 X |
| 2,134,044 | 10/1938 | Humason | 166—95 X |
| 2,958,336 | 11/1960 | Yancey | 166—224 X |

WILLIAM F. O'DEA, Primary Examiner

D. R. MATTHEWS, Assistant Examiner

U.S. Cl. X.R.

137—382.5, 454.6, 551, 583; 220—44; 251—214, 367